United States Patent [19]
Wolfer et al.

[11] Patent Number: 6,147,960
[45] Date of Patent: Nov. 14, 2000

[54] ROTATABLE HANDLING SYSTEM AND METHOD FOR HANDLING MEMORY STORAGE DISKS

[76] Inventors: Dave Wolfer, 1624 Daily Ct., San Leandro, Calif. 94577; Wray H. Russ, 143 Lynn St., Brentwood, Calif. 94513

[21] Appl. No.: 09/036,550

[22] Filed: Mar. 6, 1998

[51] Int. Cl.[7] .................................................. G11B 17/04
[52] U.S. Cl. ............................................................ 369/178
[58] Field of Search ................................ 369/34, 36, 178, 369/191, 192

[56]         References Cited

U.S. PATENT DOCUMENTS

| | | | |
|---|---|---|---|
| 4,195,961 | 4/1980 | Waiblinger | 414/120 |
| 4,417,757 | 11/1983 | Morrison | 294/26 |
| 4,470,137 | 9/1984 | Tago | 369/100 |
| 4,504,186 | 3/1985 | Richards | 414/744 |
| 4,595,481 | 6/1986 | Allen et al. | 204/298 |
| 4,726,615 | 2/1988 | Goldberg | 294/16 |
| 4,735,540 | 4/1988 | Allen et al. | 414/222 |
| 4,921,397 | 5/1990 | Wantanabe | 414/788.4 |
| 5,110,167 | 5/1992 | Friend | 294/16 |
| 5,397,214 | 3/1995 | Chueng | 414/796.7 |
| 5,505,509 | 4/1996 | Vance | 294/16 |
| 5,692,878 | 12/1997 | Freund | 414/719.6 |
| 5,721,715 | 2/1998 | Mitani et al. | 369/192 |
| 5,734,629 | 3/1998 | Lee et al. | 369/34 |
| 5,914,918 | 6/1999 | Lee et al. | 369/34 |

OTHER PUBLICATIONS

EMEDIA Professional, "Buyers Guide to CD Duplication Systems—40 New towers autoloaders jukeboxes", Nov. 1997.

*Primary Examiner*—Allen T. Cao
*Attorney, Agent, or Firm*—Kevin H. Fortin

[57]         ABSTRACT

A handling system having a turntable for handling memory storage disks including CD's and the like. The handling system includes a housing, an elevator pin and a turntable with an opening. The turntable includes a disk dispenser to dispenser disks through the turntable opening. Rotation of the turntable enables the elevator pin to catch disks dispensed from the disk dispenser. The elevator pin lowers dispensed disks away from the turntable to a recorder, for example, which writes data to the disk. The elevator pin lifts the disk back to the turntable.

4 Claims, 10 Drawing Sheets

ROTATABLE HANDLING SYSTEM AND METHOD FOR HANDLING MEMORY STORAGE DISKS

FIELD OF THE INVENTION

This invention relates to disk handling systems and particularly to handling systems for memory storage disks such as compact disks (CD's).

BACKGROUND OF THE INVENTION

U.S. Pat. No. 4,726,615 to Goldberg includes a disk handling tool having a central plunger and two flexible arms. The central plunger inserts into a disk. Actuation of the central plunger spreads the arms around the outer edge of the disk. As the disk handling tool lifts, the arms automatically grip the disk on edge. The Goldberg tool is particularly suited to moving disks to and from standard CD cases because the case can press against the central plunger.

U.S. Pat. No. 5,505,509 to Vance includes a tool having a trigger, a spindle catch and a soft curved cup. Each disk has a central opening. The spindle catch inserts through the opening and aligns axially with respect to the disk. Actuation of the trigger axially misaligns the spindle catch. The disk is held between the spindle catch and the soft curved cup.

U.S. Pat. No. 5,692,87 to Freund discloses a disk handling system which separates disks from a stack of disks. The Freund system is a double-gantry system. The double gantry system includes a lifting means, tapered shaft, a spring arm and a gripper.

The tapered shaft inserts centrally within a stack of disks. The spring arm is fixed relatively above the stack. The lifting means vertically lifts the stack against the spring arm. The spring arm offsets the uppermost disk from top of the stack. The gripper grasps the edge of the offset disk by its edge and pivots to move the disk from the top of the stack.

Double gantry systems, in general, have a large number of moving parts and typically include a pivoting gripper. These parts must be coordinated to enable the gripper to properly grasp a disk. The probability of wear and malfunction typically increases with each additional moving part. What is desired is a simple system which operates without much adjustment, and which reliably handles disks.

SUMMARY OF THE INVENTION

A rotatable handling system for memory storage disks includes a housing, a recorder, a turntable, a motor and a drive linkage for rotating the turntable. The turntable delivers disks to the recorder. The recorder writes data to the delivered disks.

The turntable includes a disk dispenser mounted on the turntable and an opening. An elevator pin mounts in the housing and reciprocates to move disks between the turntable and the recorder. The elevator pin is appropriately timed, by the mechanical linkage to be precisely positioned with respect to the disk dispenser and turntable opening to catch dispensed disks.

The turntable includes a hopper which feeds disks to the disk dispenser. The hopper holds disks at an angle with respect to the turntable. The disk dispenser aligns the disks with the turntable and feeds disks one at a time through the turntable opening and in alignment with the turntable. When the disk dispenser feeds disks through the turntable opening, the elevator pin is precisely positioned adjacent the turntable opening to catch the fed disks. The recorder is positioned relative to the elevator pin and turntable opening to receive disks fed through the turntable opening.

According to one aspect of the invention, the turntable includes a second opening and an accept hopper mounted on the turntable adjacent the second opening. The elevator pin reciprocates and lifts recorded disks from the recorder into the accept hopper via the second opening.

The turntable includes a surface having an axis and an opening. The surface has a periphery which surrounds the opening. The central post extending from the surface along the axis. The outer posts extend perpendicularly from the surface relative to the opening and in cooperation with the central post form a hopper. Disk clips mount on the periphery of the opening for holding disks in the hopper. It can be appreciated that the outer posts align co-radially with respect to the central post. It can also be appreciated that any of a variety configurations can be construed to have posts, such configurations include coils, walls, etc.

The disk clips include a hinge which rotates from a first position were the disk clips align with the surface to a second position where the disk clips extend nearly perpendicular from the surface to allow disks to move through the turntable. The disk clips include a spring to bias the disk clip in alignment with the turntable. The spring flexes as the disk clip extends from the turntable surface. The disk clips include angled ends to contact a disk edge and align the disk in parallel with the turntable when a disk passes through the turntable. The spring is preferably fabricated from a strip of resilient material.

DETAILED DESCRIPTION

Figure 1:
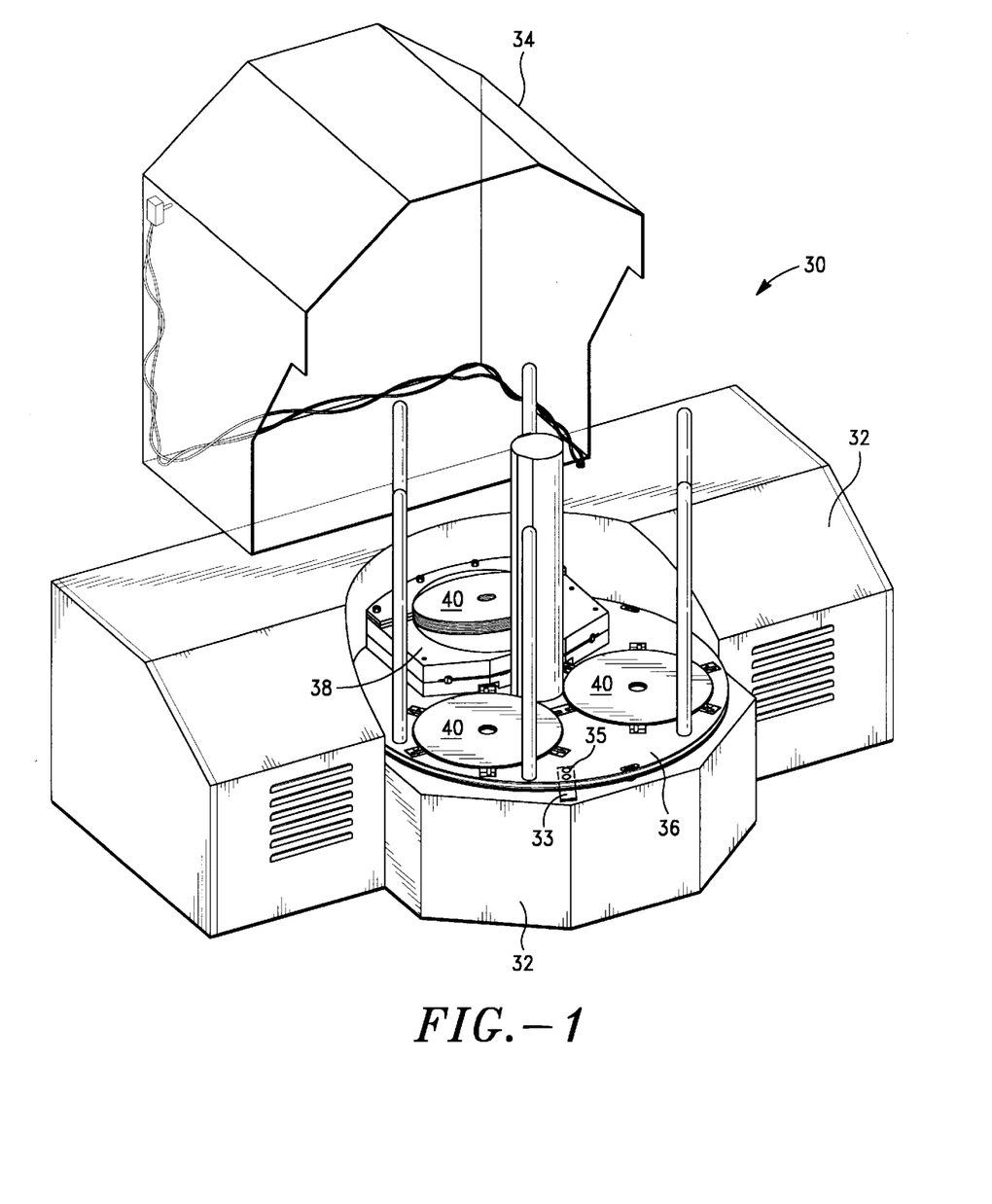
FIG. 1 is a perspective view of a disk duplication system in accordance with the present invention.

FIG. 1 shows a disk duplicator system, generally designated with the reference numeral 30. The system 30 includes a housing 32 with a cover 34, a turntable 36, and a disk dispenser 38. The turntable 36 includes several hoppers for feeding and accepting disks 40. The turntable 36 rotates to move the disks 40 along an arcuate path. The system 30 includes a sensor 33 mounted on a portion of the housing 32, adjacent the turntable 36.

The disk dispenser 38 dispenses disks 40 into the housing 32. The housing 32 encloses a recorder to write data on the dispensed disks. The turntable 36 rotates to accept the data written disk in a selected hopper for temporary storage. Rotation of the turntable enables the disk dispenser 38 to dispense another disk into the housing 32, and the process of writing data to repeat.

The turntable 36 includes embedded magnets 35. The sensor 33 detects the magnets 35 to enable the system to recognize when the turntable 36 is in a desired rotational position with respect to the housing 32.

The present invention is particularly useful in conjunction duplicating data on memory storage disks 40. It can be appreciated, however, that a variety of media including or other optical or magnetic memory storage media may be dispensed and duplicated in accordance with the present invention.

Figure 2:
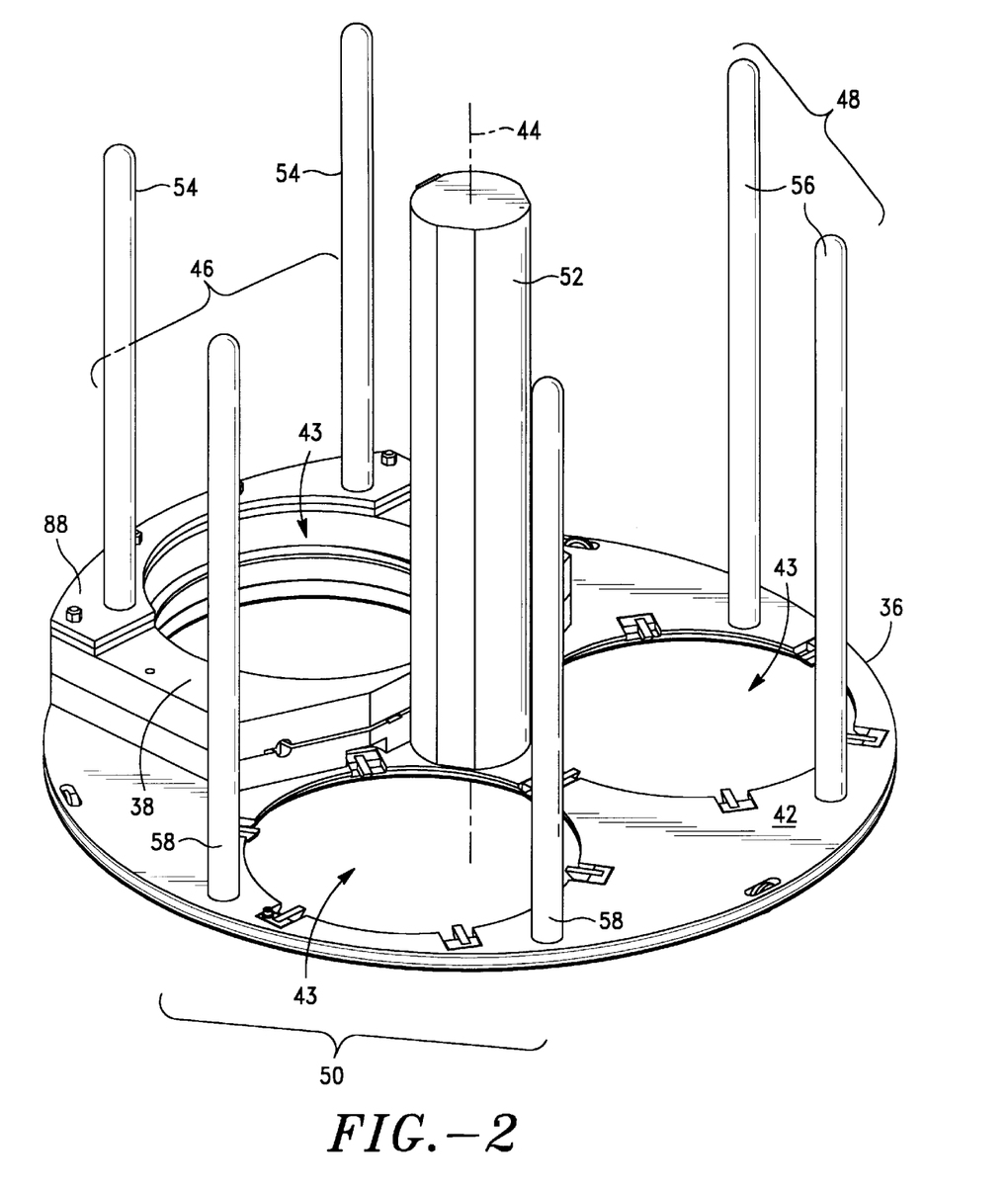
FIG. 2 is a perspective view of the turntable of FIG. 1.

FIG. 2 shows the turntable 36. The turntable 36 includes a central post 52, paired outer posts 54, 56 and 58, and a surface 42 defining three openings 43. The turntable has an axis 44, a generally designated feed hopper 46, accept hopper 48, and reject hopper 50. The hoppers 46, 48 and 50 generally align adjacent a respective opening 43 to dispense or accept disks through each respective opening.

The disk dispenser 38 mounts on the turntable 36 adjacent one respective opening 43 to dispense disks through the turntable 36. The outer posts 54 cooperate with the central post 52 to define the hopper 46 which guides disks into the disk dispenser 38.

The central post 52 aligns with the turntable axis 44. The outer posts 54, 56 and 58 are positioned co-radially with respect to the turntable axis 44. The outer posts 56 and 58 cooperate with the central post 52 to surround the respective turntable openings 43 and to define the reject hopper 48 and accept hopper 50, respectively. Although outer posts 54, 56 and 58 cooperate with the central post 52 to define the hoppers 46, 48 and 50 and provide a light weight structure to guide disks, it can be appreciated that hoppers may assume any of a number of configurations. A hopper may be defined, for example, by a cylindrical wall, by a helical coil, or by another structure having a light weight design.

Figure 3:
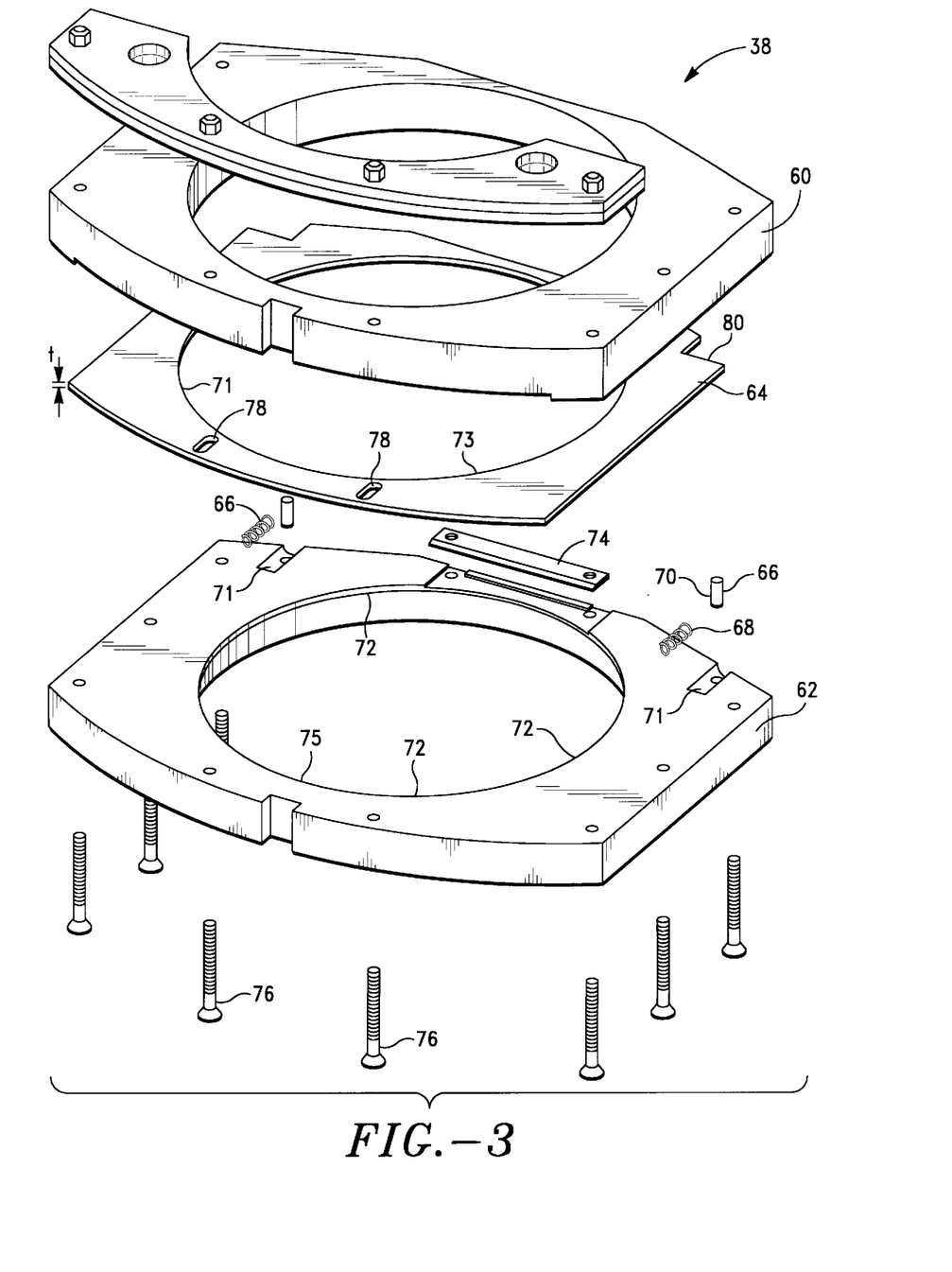
FIG. 3 is an exploded perspective view of the disk dispenser of FIG. 1.

FIG. 3 shows an exploded view of the disk dispenser, generally designated 38. The disk dispenser 38 includes an upper guide 60, a lower guide 62 and a plate 64. The lower guide 62 includes a spring 68, a rim 72, a support lip 74, all opposing edge 75, and fasteners 76. The plate 64 includes an arced edge 71. The arced edge 71 defines an inner periphery 73. The inner periphery 73 defines an opening for surrounding a disk. Preferably, the inner periphery 73 is circular for circumscribing a disk. The inner periphery 73 is configured with a beveled edge for separating single disks from a stack of disks.

The upper guide 60, the lower guide 62 and the plate 64 each define a generally circular opening to enable a disk to pass through the disk dispenser 38. Each opening is sized for a disk to pass through when the disk parallels the plate 64. The upper guide 60 and the lower guide 62 are axially offset from each other so that a portion of the rim 72 of lower guide 62 stops disks which may fall thorough the upper guide 60 towards the lower guide 62. The opposing edge 75 diametrically opposes the support lip 74. The support lip 74 cooperates with the opposing edge 75 to hold a disk on the lower guide 62. The plate 64 slidably mounts between the upper guide 60 and the lower guide 62 to selectively pass disks stopped by the lower guide 40 through the lower guide 62.

The pin 70 extends between the lower guide 62 and the upper guide 60 to retain the spring 68. The plate 64 includes a pair of holes 78 which align with respective fasteners 76. The fasteners 76 extend through the upper guide 60, the plate 64 and the lower guide 62 to hold the upper guide 60 and the lower guide 62 together. The fasteners 76 retain the plate 64 between the upper guide 60 and the lower guide 62. The fasteners 76 align the plate 64 relative to the upper guide 60 and the lower guide 62 when the plate 64 slides.

The lower guide 62 includes a groove 71. The spring 68 is a coil spring having two ends. The spring 68 lies in the groove 71. The pin 70 inserts perpendicularly into the groove 71. Accordingly, one end of the spring 68 contacts the pin 70. The spring 68 biases the plate 62 in a desired position. According to one aspect of the invention, the spring 68 offsets the plate 62 from the lower guide 62 to enable the lower guide 62 to support a disk.

The plate 64 has a shoulder with an edge 80. The edge 80 contacts the other end of the spring 68. The spring 68 biases the plate 64 into a desired position relative to the lower guide 62. When the plate 64 slides towards the pin 70, the spring 68 dampens movement of the plate 64. The plate 64 has a generally uniform thickness "t". The thickness "t" approximates the thickness of an individual disk to be dispensed so that when the plate 64 slides, only one disk is dispensed.

Figure 4:
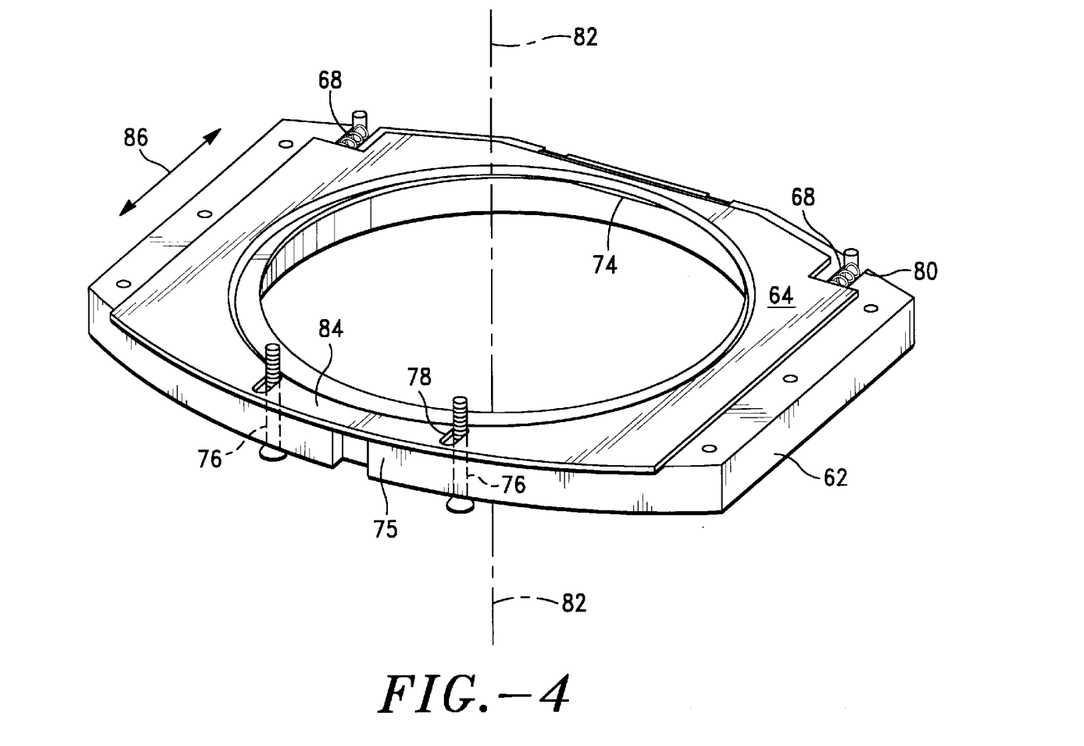
FIG. 4 is a perspective view of a portion of the dispenser of FIG. 3.

FIG. 4 is a perspective view of the plate 64 and the lower guide 62. The plate 64 reciprocates with respect to the lower guide in the directions of the arrows 86. The lower guide 62 opening defines an axis 82. The spring 68 biases the plate 64 so that the plate opening is axially offset from the lower guide opening. Offsetting the plate 64 opening from the lower guide 62 opening enables the support lip 74, in cooperation with the opposing edge 75, to hold a disk on the lower guide 62. The plate 64 circumscribes a disk when the disk is on the lower guide 62. The plate 64 slides towards the springs 68 to dispense a disk through the lower guide 62 opening. The springs 68 reciprocate the plate 64.

Figure 5:
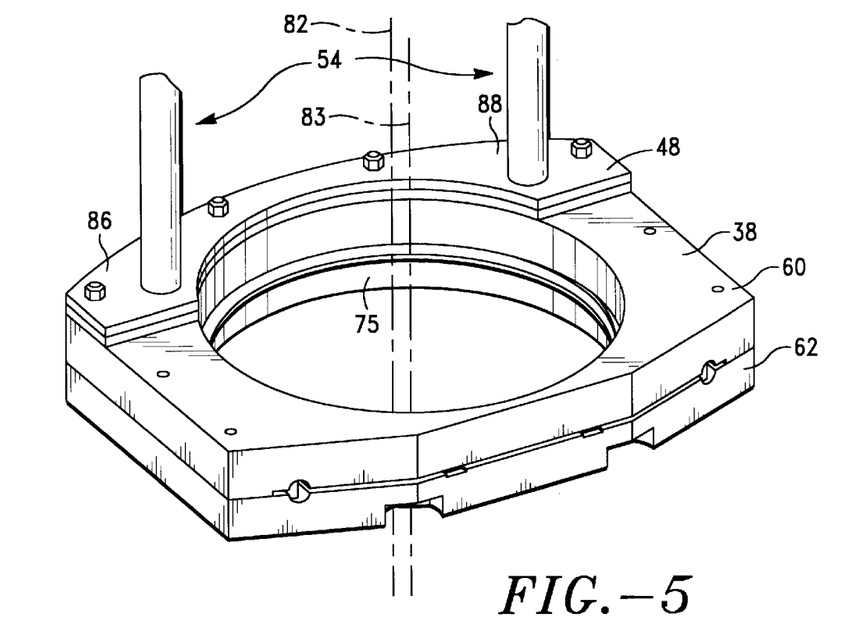
FIG. 5 is a perspective view of the disk dispenser of FIG. 3 and a portion of a feed hopper.

FIG. 5 is a perspective view of the disk dispenser 38 attached to the feed hopper 46. The feed hopper 46 is configured with a reinforcement plate 88 which bolts to the upper guide 60. The outer posts 54 mount on the reinforcement plate 88. Accordingly, the feed hopper attaches to the disk dispenser. The reinforcement plate 88 inhibits flexion of the disk dispenser 38 while supporting the feed hopper 46 (see FIG. 2).

The upper guide 60 has an opening with an axis 83. The axis 82 of the lower guide 62 opening is axially offset from the axis 83 of the upper guide 60 opening.

Figure 6:
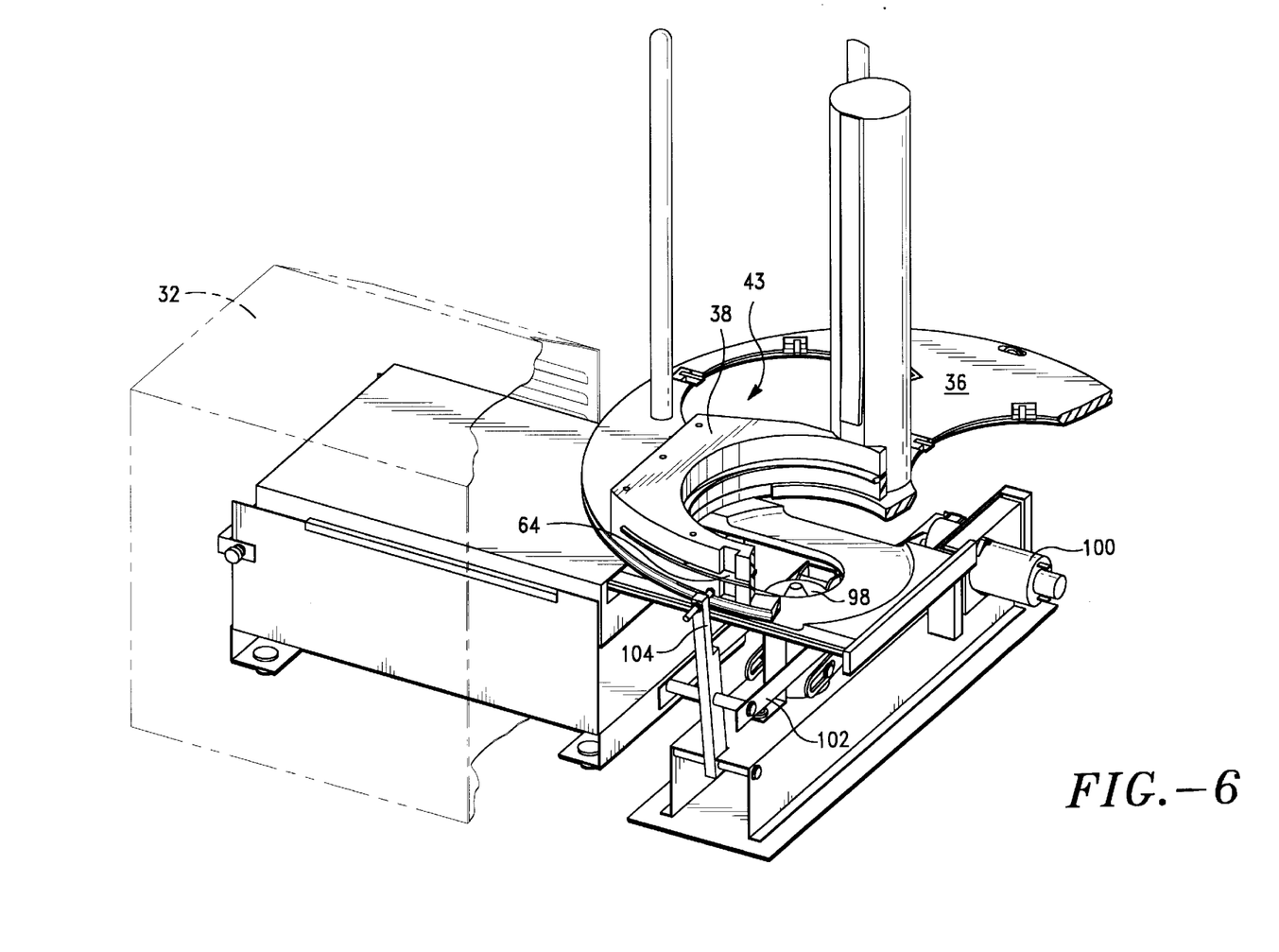
FIG. 6 shows a cutaway rear perspective view of the system of FIG. 1.

FIG. 6 shows a cutaway rear perspective view of the housing 32. The housing 32 includes a motor 100, a mechanical linkage 102, the elevator pin 98 and an arm 104. The arm 104 and the elevator pin 98 connect via the mechanical linkage 102 to the motor 100. The motor 100 actuates the mechanical linkage 102 to cause the arm 104 to slide the plate 64 and to lift and lower the elevator pin 98. Movement of the linkage 102 and rotation of the turntable 36 dispense disks, one at a time, from the dispenser 38 onto the elevator pin 98. Movement of the linkage 102 may also insert disks, one at a time, through the opening 43 in the turntable 36 when the turntable 36 rotates.

Figure 7:
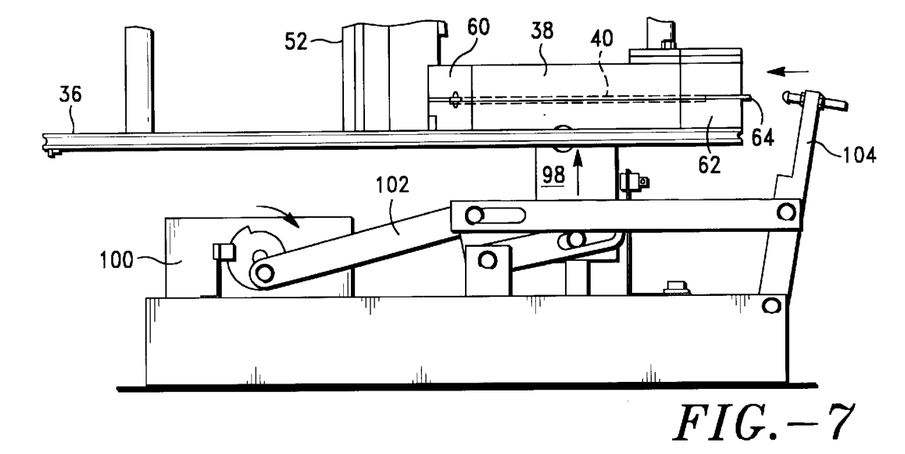
FIG. 7, FIG. 8, and FIG. 9 are side views, in sequence, of the elevator pin moving a disk from the turntable of FIG. 1.

FIG. 7 shows a side view of the disk dispenser 38, the turntable 36 and the linkage 102. The motor 100 actuates the linkage 102. The linkage 102 elevates the elevator pin 98 towards the turntable 36 and moves the arm 104. The arm 104 moves towards the plate 64 of the disk dispenser.

Figure 8:
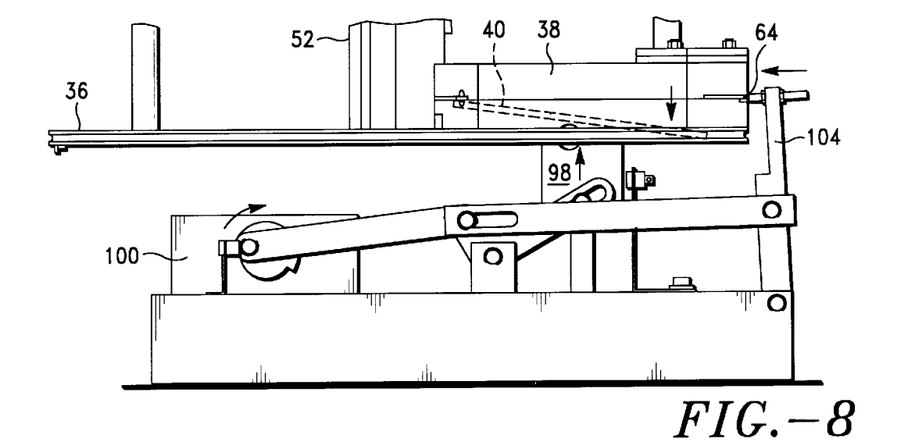

FIG. 8 shows further movement of the linkage 102. The arm 104 presses against the plate 64 to slide the plate 64. Sliding the plate 64 relative to the upper guide 60 and the lower 62 guide causes the dispenser 38 to drop the disk 40 onto the elevator pin 98.

Figure 9:
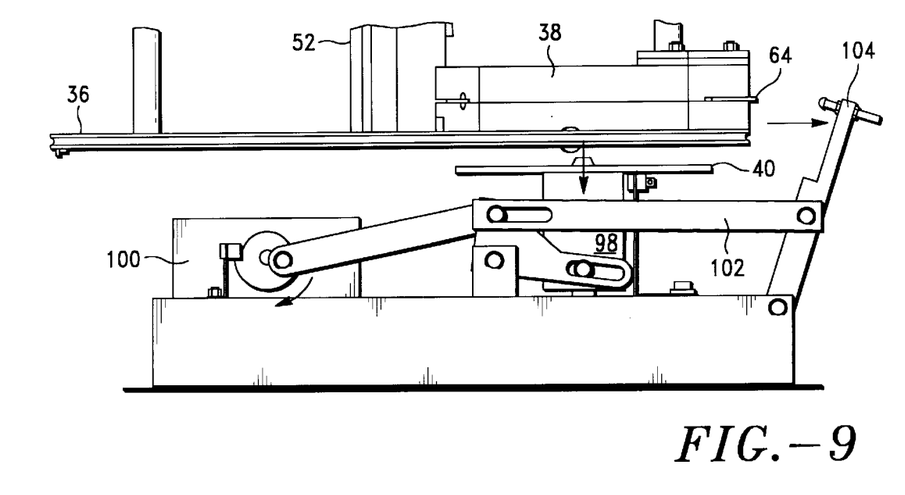

FIG. 9 shows further movement the linkage 102. The elevator pin 98 retracts from the dispenser 38. The arm 104 simultaneously withdraws from the dispenser 38. The elevator pin 98 lowers the dispensed disk 40 away from the dispenser 38.

A single elevator pin cycle is completed when the elevator pin 98 retracts and the arm 104 withdraws. At this point in the cycle, the turntable 36 rotates. Rotation of the turntable 36 enables a subsequent cycle of the elevator pin 98 to lift the disk 40 back onto the turntable 36, for example.

Figure 10:
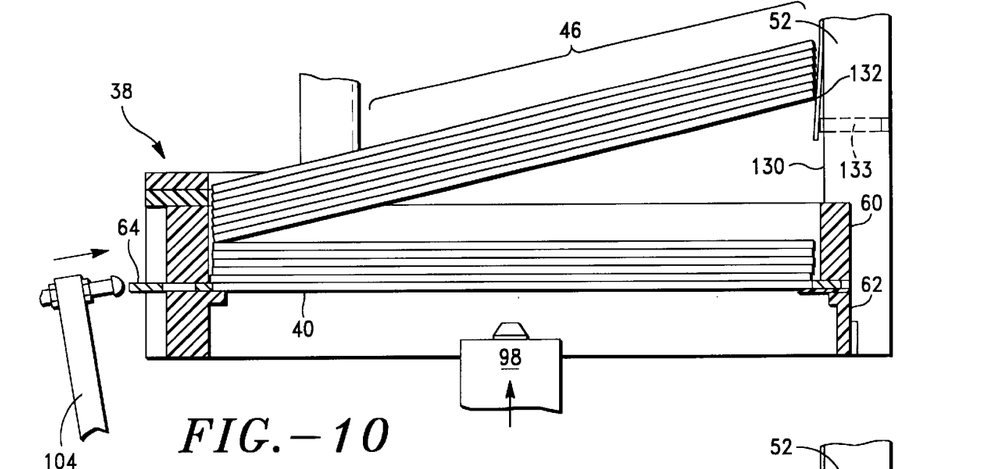
FIG. 10, FIG. 11 and FIG. 12 correspond with FIG. 7, FIG. 8 and FIG. 9, respectively, and show partial cross-sectional views of the disk dispenser from a reversed angle.

FIG. 10 shows the arm 104 moving towards the plate 64. The support lip 74 and the opposing edge 75 of the lower guide 62 support the disk 40. The elevator pin 98 moves towards the dispenser 38 and the arm 104 moves towards the plate 64. Preferably, the upper guide 60 holds from 4–6 disks in parallel with the plate. The three hoppers are each adapted to hold between 100–150 disks.

The central post 52 of the feed hopper 46 includes a recessed portion 130, an extended portion 132 and an adjustable set screw 133. The recessed portion 130 is adjacent the upper guide 60 to feed disks, in horizontal alignment with the plate 64, from the feed hopper 46 to the upper guide 60. The set screw 133 rotatably extends through the central post 52 to adjust the distance at which the extended portion 132 extends from the central post 52 and insures proper feeding of disks from the feed hopper 46 to the upper guide 60.

The extended portion 132 aligns disks stacked in the feed hopper 46 at an angle with respect to the plate 64. Aligning disks at an angle within the feed hopper 46 minimizes forces caused by disk weight on the disk dispenser 38, and particularly on the plate 64. Minimizing such forces enables multiple disks to be stacked in the feed hopper 46, and optimizes reliability of the disk dispenser.

Figure 11:
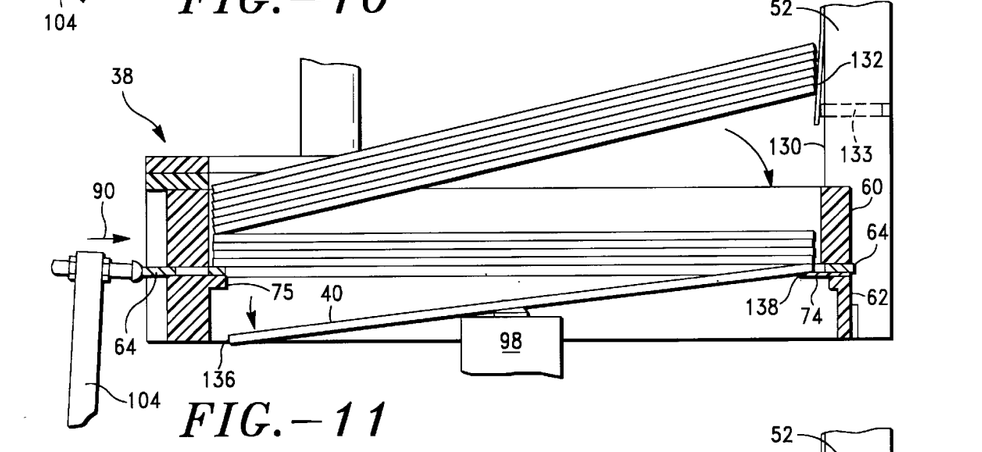

FIG. 11 shows the arm 104 contacting the plate 64. The disk 40 has two opposing edges 136 and 138. The arm 104 contacts the plate 64 to slide the plate 64 in the direction of the arrow 90. The plate 64 urges the edge 136 of the disk 40 off of the edge 75 of the lower guide 62. Reciprocation of the plate 64 urges the other edge 138 of the disk 40 off of the support lip 74 so that the disk 40 falls from the lower guide 60 onto the elevator pin 98.

Figure 12:
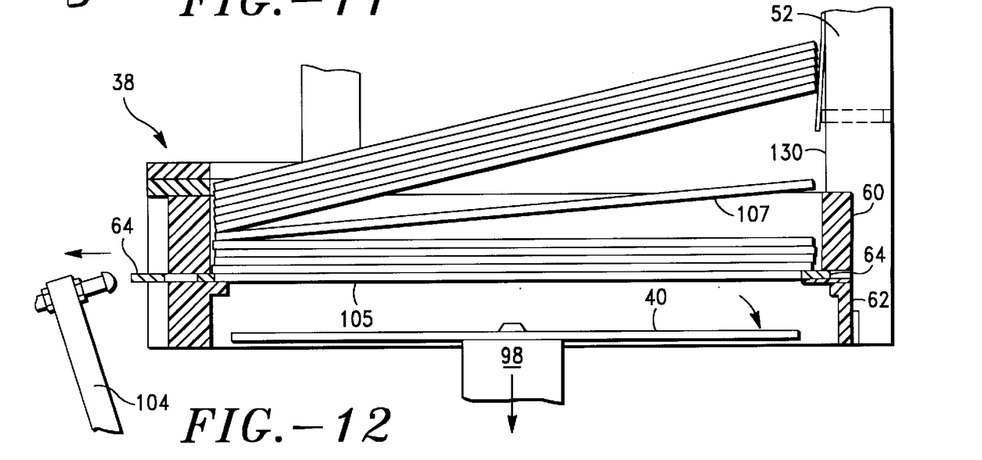

FIG. 12 shows the arm 104 withdrawn from the plate 64. The plate 64 automatically reciprocates as the arm 104 withdraws. The plate 64 guides the next disk 105 onto the lower guide 62. Movement of the next disk 105 onto the lower guide 62 causes another disk 107 to fall from the hopper into the upper guide 60.

Figure 13:
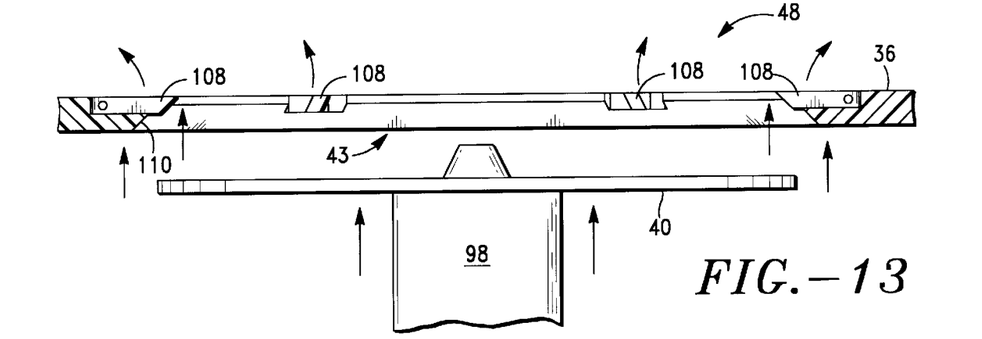
FIG. 13, FIG. 14, and FIG. 15 shows a cross-sectional side view of the elevator pin lifting a disk.

FIG. 13 shows the elevator pin 98 lifting the disk 40 towards the turntable 36 from below the opening 43 of the accept hopper 48. The turntable defines the opening 43 to enables disks to pass into the accept hopper from beneath the turntable 36. The turntable 43 includes a periphery I 10 surrounding the opening 43. A plurality of disk clips 108 mount on the periphery 110. The disk clips 108 function to allow the disk 40 to move through the turntable 36 into the accept hopper in only one direction, in the direction of the arrow 106.

Figure 14:
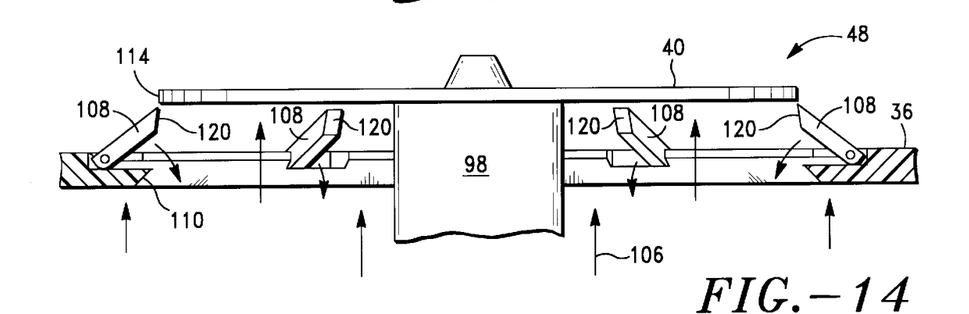

FIG. 14 shows the elevator pin 98 lift the disk 40 in the direction of the arrows 106 above the turntable 36. The elevator pin 98 passes through the turntable 36 with the disk 40. The disk 40 lifts the disk clips 108 as the disk 40 passes through the turntable 36. The disk 40 has an outer edge 114. The disk clips have ends 120. As the elevator pin 98 passes through the turntable, the outer edge 114 of the disk contacts the ends 120 of the disk clips 108.

The ends 120 of the disk clips 108 are angled to contact primarily the outer edge 114 of the disk 40. The angled ends 120 align the disk 40 in parallel with the turntable 36 as the disk passes through the turntable 36. This alignment insures that the disk 40 will not flutter on the elevator pin 98 when the elevator pin 98 lifts the disk through the turntable 36. The elevator pin 98 reciprocates to place the disk 40 on to the disk clips 108.

Figure 15:
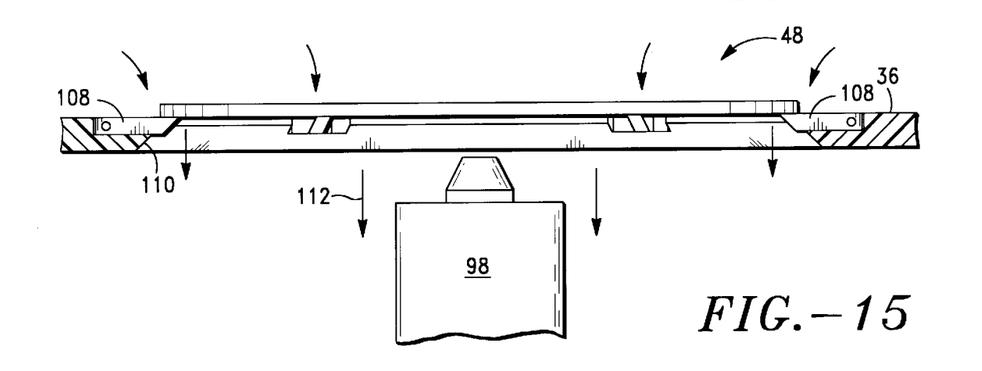

FIG. 15 shows the elevator pin 98 reciprocating in the direction of the arrows 112. The disk clips 108 extend radially towards the center of the opening 110. The elevator pin drops the disk 40 on the disk clips 108 so that the disk clips support the outer edge 114 of the disk 40. The disk clips 108 align with the turntable 36 to support the disk 40 on the turntable 36. The disk clips 108 can support a stack of disks. It can be appreciated that by repeating the process shown in FIG. 13, FIG. 14 and FIG. 15 that elevator pin stacks multiple disks on the disk clips 108 via the turntable opening 110 from beneath the turntable 36. Preferably, when the disk clips 108 support a stack of disks, the elevator pin 98 is strong enough to lift the stack of disks supported when the elevator pin 98 lifts a disk through the turntable 36.

Figure 16:
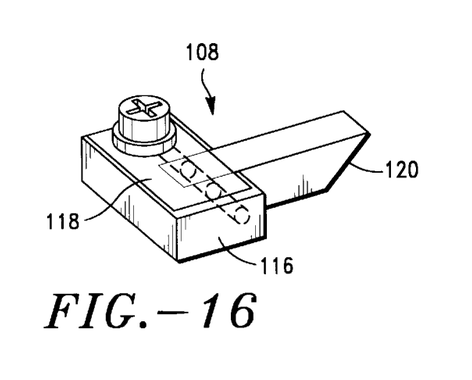
FIG. 16 and FIG. 17 show a disk clip in accordance with FIG. 15 and FIG. 14, respectively.

FIG. 16 shows a disk clip 108. The disk clip 108 includes a hinge 116, a spring 118 and the angled end 120. The spring 1 18 includes a strip of resilient material which covers a portion of the disk clip 108 to bias the disk clip 108 in the configuration shown.

Figure 17:
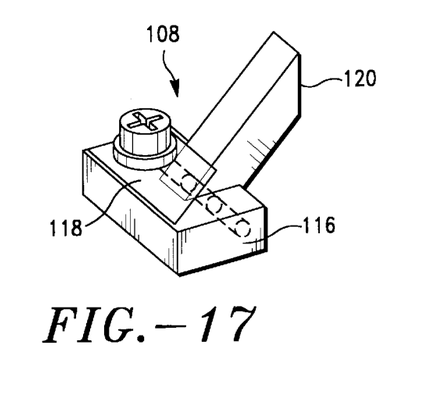

FIG. 17 shows the disk clip 108 rotated about the hinge 116. The disk clip 108 extends at an angle with respect to the hinge 116. The hinge 166 allows the disk clip 108 to extend nearly perpendicular from the hinge 116. The spring 118 flexes and the beveled edge 120 aligns perpendicularly to the hinge 116 and to the turntable surface, see FIG. 13.

Figure 18:
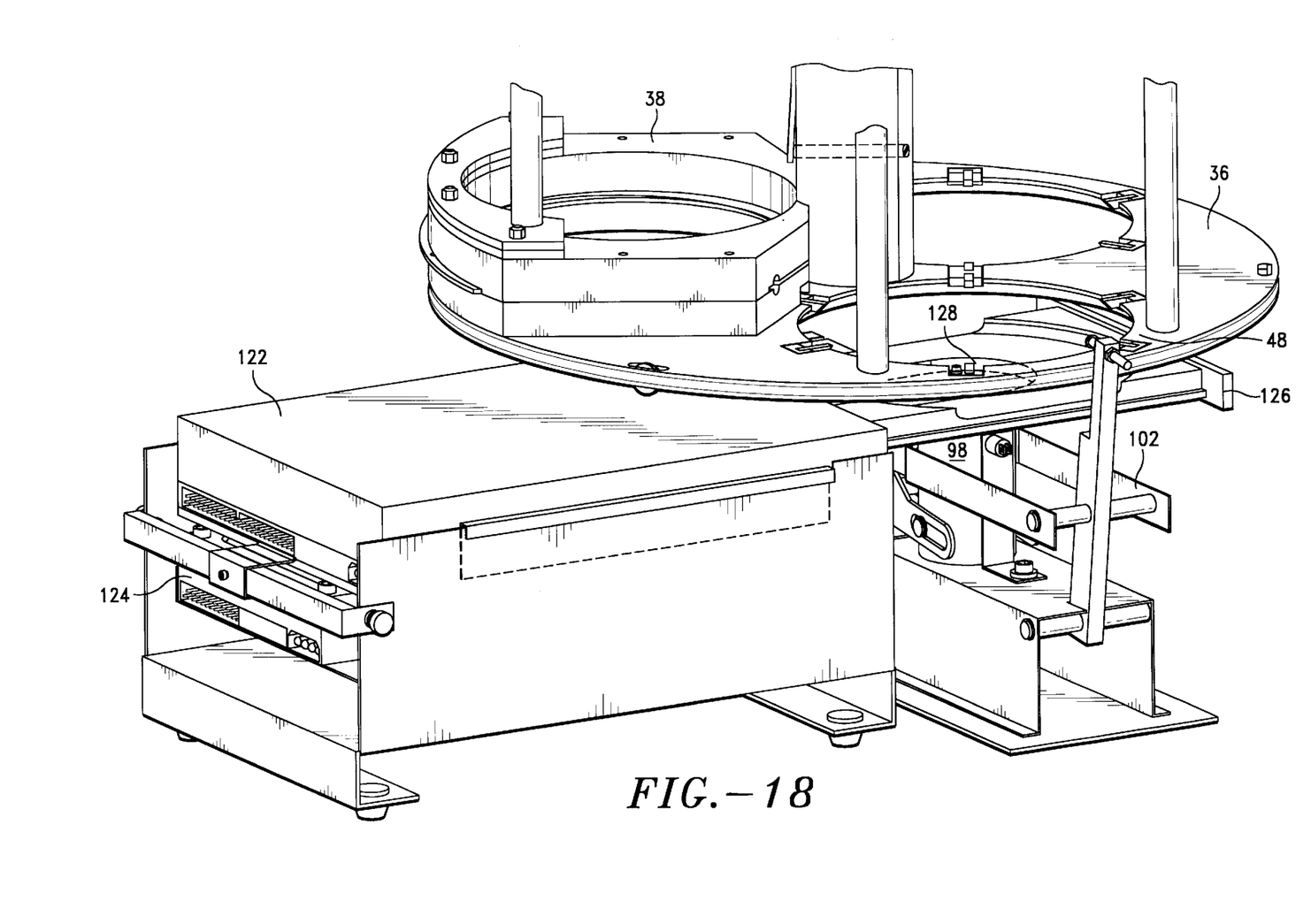
FIG. 18 is a perspective view of a disk recorder positioned in an operative arrangement with respect to the turntable and linkage mechanism in accordance with the present invention.

FIG. 18 shows the turntable 36, a recorder 122, a hard drive 124, the elevator pin 98, and the mechanical linkage 102. The recorder 122 includes a tray 126. The tray 126 automatically extends from the recorder 122 to interpose a disk between the elevator pin 98 and the turntable 36, or to catch a disk which is dispensed from the disk dispenser 38. The tray 126 includes an opening 128 to enable the elevator pin 98 to extends through the turntable 36, via the tray 126. The hard drive 124 couples with the recorder 122 to deliver data to be written. A controller including a circuit board within the housing regulates operation of the hard drive 124, the recorder 122, the linkage 102 and the turntable 36. According to one aspect of the invention, the recorder 122 is a CD-R, DVD-R or any other disk recorder which is now available or which may be developed. It can be appreciated that the housing 32 of FIG. 1 encloses the recorder 122, the hard drive 124, the pin 98 and the linkage 102. The recorder 122 in combination with the disk dispenser 38, turntable 36 and the elevator pin 98 enables mass duplication of recordable CD's.

Figure 19:
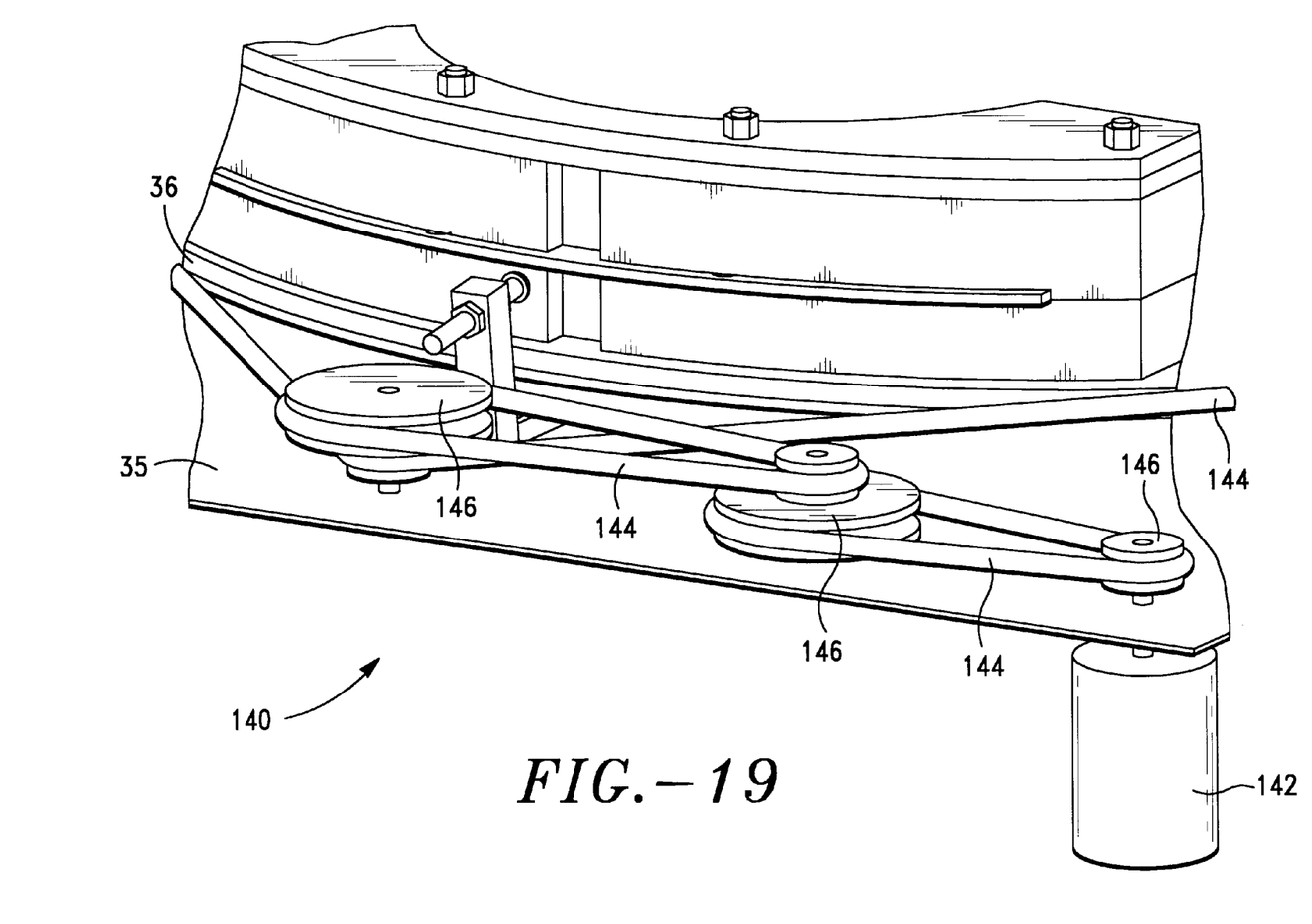
FIG. 19 is a perspective view of the drive linkage for the turntable of FIG. 1.

FIG. 19 is a perspective view of a portion of the linkage assembly, generally designated 140, which rotates the turntable 36 in accordance with the present invention. The drive linkage assembly 140 mounts on a portion of the housing 32. The assembly 140 includes a motor 142, belts 144, and pulleys 146. The belts 144 and pulleys 146 operate to selectively rotate the turntable 36 at a desired rate.

IN OPERATION

With general reference to the drawings, a method for writing to memory storage disks includes the steps of storing data, rotating the turntable 36 to deliver a disk 40 to the recorder 122, writing the stored data to the disk, removing the disk from the recorder 122, and returning the disk to the turntable 36. The steps of rotating, writing, removing and returning repeat.

The method also includes the step of comparing the stored data to the written data to match the written data and the stored data. This step assures that the present invention duplicates disks without errors. Accordingly, the elevator pin 98 returns the disk to the turntable 36, into the accept hopper when the stored data matches the written data. When the stored data fails to match the written data, the turntable 36 further rotates to enable the elevator pin 98 to return the disk to the reject hopper.

The step of delivering the disk to a recorder 122 includes extending a tray from the recorder 122 to receive a disk from the turntable 36. The step of writing the stored data includes retracting the tray to move the disk into the recorder 122. Returning the disk to the turntable includes extending the tray 126 and lifting the disk from the tray 126, onto the turntable 122 with the elevator pin 98.

This detailed description describes but one embodiment of the present invention. It can be appreciated that this description is not limiting of the present invention. For example, the turntable may be configured in any manner consistent with holding disks, and may hold the disks in a variety of orientations. Additionally, the disk dispenser may be configured any of a number of ways which enable a sliding plate, arm or prod to separate and dispense disks. With these and other variations in mind, the invention is to be limited only by the following claims.

We claim:

1. A turntable for memory storage disk handling system, comprising:

a surface having an axis and an opening, the surface has a periphery which surrounds the opening;

a central post extending from the surface along the axis;

outer posts extending perpendicularly from the surface relative to the opening and in cooperation with the central post form a hopper adjacent the opening; and disk clips mounted on the periphery for holding disks in the hopper, the disk clips include a hinge which rotates from a first position where the disk clips align with the surface to a second position where the disk clips extend from the surface to allow disks to move through the turntable.

2. A turntable as set forth in claim 1, wherein the disk clips include a spring to bias the disk clip in alignment with the turntable the spring flexes as the disk clip extends from the turntable surface.

3. A turntable as set forth in claim 1, wherein the disk clips include angled ends to contact a disk edge and align the disk in parallel with the turntable when a disk passes through the turntable.

4. A turntable as set forth in claim 1, wherein the disk clips include a spring to bias the disk clip in alignment with the turntable, the spring is fabricated from a strip of resilient material.

* * * * *